United States Patent [19]
Ashkin

[11] 3,778,612
[45] Dec. 11, 1973

[54] NEUTRAL PARTICLE BEAM SEPARATOR AND VELOCITY ANALYZER USING RADIATION PRESSURE

[76] Inventor: Arthur Ashkin, Allencrest Rd., Rumson, N.J. 07760

[22] Filed: Nov. 1, 1971

[21] Appl. No.: 194,733

Related U.S. Application Data

[63] Continuation-in-part of Ser. No. 885,070, Dec. 15, 1969, Pat. No. 3,710,279.

[52] U.S. Cl........... 250/251, 250/505, 331/94.5 A
[51] Int. Cl........................................ H01j 39/34
[58] Field of Search................ 250/41.9 DS, 41.9 G, 250/41.3; 328/233

[56] References Cited
UNITED STATES PATENTS

| | | | |
|---|---|---|---|
| 3,532,879 | 10/1970 | Braunstein et al. | 250/41.9 DS |
| 3,558,877 | 1/1971 | Pressman | 250/41.9 DS |

Primary Examiner—James W. Lawrence
Assistant Examiner—B. C. Anderson
Attorney—W. L. Keefauver et al.

[57] ABSTRACT

In the disclosed neutral-particle molecular-beam or atomic-beam separator, velocity analyzer or synchrotron, it is proposed to use the saturated value of radiation pressure on the particles, illustratively neutral particles, to deflect them in semicircular paths or in circular orbits. A light field at a resonance radiation frequency for the particles is created that converges radially in a horizontal plane throughout the desired portion or arc of a circle with intensity sufficient to exceed the saturated value and thus create a constant central force field. The field of use includes studying the interaction of atoms with high-intensity monochromatic light, and also includes separating, velocity analyzing or trapping neutral atoms having a specific hyperfine level or belonging to a specific isotopic species, such as those useful for nuclear power generation.

6 Claims, 5 Drawing Figures

PATENTED DEC 11 1973							3,778,612

NEUTRAL PARTICLE BEAM SEPARATOR AND VELOCITY ANALYZER USING RADIATION PRESSURE

CROSS-REFERENCE TO RELATED APPLICATION

This application is a continuation-in-part of my copending patent application, Ser. No. 885,070, filed Dec. 15, 1969 now U.S. Pat. No. 3,710,279, and assigned to the assignee hereof.

BACKGROUND OF THE INVENTION

This invention relates to the controlled use of the effects of radiation pressure upon beams of particles moving with respect to their environment, especially beams of neutral atoms or molecules.

Historically, radiation pressure is a physical effect that has been occasionally studied in the laboratory but has been consistently considered to be of no practical interest because of the obscuring effects of thermal forces. These thermal forces are caused by temperature gradients in the medium surrounding an object and, in general, are termed radiometric forces. When the gradients are caused by light specifically and the resulting thermal force moves the entire particle, the effect is called photophoresis. Radiometric forces and photophoresis, in particular, are usually orders of magnitude larger than the force due to radiation pressure. Even in the typical experiment with a laser radiation source, photophoresis usually completely obscures radiation pressure. For example, see the article by A. D. May et al., *Journal of Applied Physics*, Vol. 38, page 5290 (1967).

Heretofore, many techniques, such as synchrotron techniques, have been known for trapping a beam of charged particles; and beams of charged particles of differing charge or mass can be separated by transverse electric or magnetic fields. These techniques are not typically applicable to neutral particles.

It is also known, as in J. Pressman U.S. Pat. No. 3,558,877, or in "Untersuchungen zur Molekular Strahlmethode," by O. R. Frisch, *Zeitschrift fur Physik*, 86, 42 (1933), that a transverse traveling-wave optical beam of the frequency of resonance radiation for one component of the molecular or atomic beam can separate that portion of the beam from the remainder and thereby produce two diverging molecular or atomic beams.

As used here, resonance radiation is that radiation emitted by atoms or molecules in an interaction with supplied monochromatic radiation of frequency that closely matches the frequency of an absorptive and re-radiative transition of some of the atoms or molecules. The supplied radiation of that frequency can also be called "resonance radiation," even though supplied from a laser or similar source. The atoms or molecules re-radiate at the same frequency. The absorption is spatially anisotropic, that is, directional, because the absorbed light is absorbed from a particular direction in the beam at a particular point in the path of the particles. The re-radiation is isotropic because it occurs equally in all directions at each point of the path. A net force on the absorbing and re-radiating particles results from the resonant process. That force at any point is in the direction of propagation of the supplied optical beam at that point.

Thus, in the apparatus of the above-cited Pressman patent, a lateral deflection of one component of the atomic or molecular beam occurs because of the resonant process of absorption and re-radiation by that component.

Nevertheless, the angular deflection of the one component and the resulting spatial resolution of the two beams are rather limited because the deflected component Doppler-shifts out of resonance with the supplied radiation. That is, the molecules or atoms acquire a velocity component in the same direction as the supplied radiation; and the apparent supplied frequency as sensed by the deflected atoms or molecules is decreased. This apparent decrease in supplied frequency due to the Doppler effect could be called a "red-shift" in analogy to the use of that term in the field of astronomy.

One potential field of application of the subject atomic or molecular beam separation technique is the separation of isotopes useful for nuclear power generation, such s $U^{235}$ from $U^{238}$ or deuterium ($H^2$) or tritium ($H^3$) from common hydrogen ($H^1$). Each isotope differs from its closest relative significantly in the frequencies of certain absorptive and re-radiative transitions. In fact, with sufficient spatial resolution of the molecular or atomic beams, the separation of differing atomic or molecular beams from a single beam of the mixed isotopes could promptly replace the well-known gaseous diffusion techniques for separating such isotopes commerically.

SUMMARY OF THE INVENTION

According to my invention, the saturated value of radiation pressure on beam of neutral particles is used to deflect them in circular-arc paths with suprisingly high resolution and large angular deflection or in closed circular orbits highly selective of a particular species. A light field is created that converges radially in a horizontal plane throughout the desired portion or arc of a circle with intensity sufficient to exceed a saturated value of radiation pressure and thus create a constant central force field.

The field of use of the invention advantageously includes such applications as studying the interactions of atoms with high-intensity monochromatic light, especially resonance radiation interactions. It also includes separating, velocity analyzing or trapping neutral atoms having a specific hyperfine level or belonging to a specific isotopic species, such as those useful for nuclear power generation.

BRIEF DESCRIPTION OF THE DRAWING

Further features and advantages of my invention will become apparent from the following detailed description, taken together with the drawing, in which.

DESCRIPTION OF ILLUSTRATIVE EMBODIMENT

Figure 1:
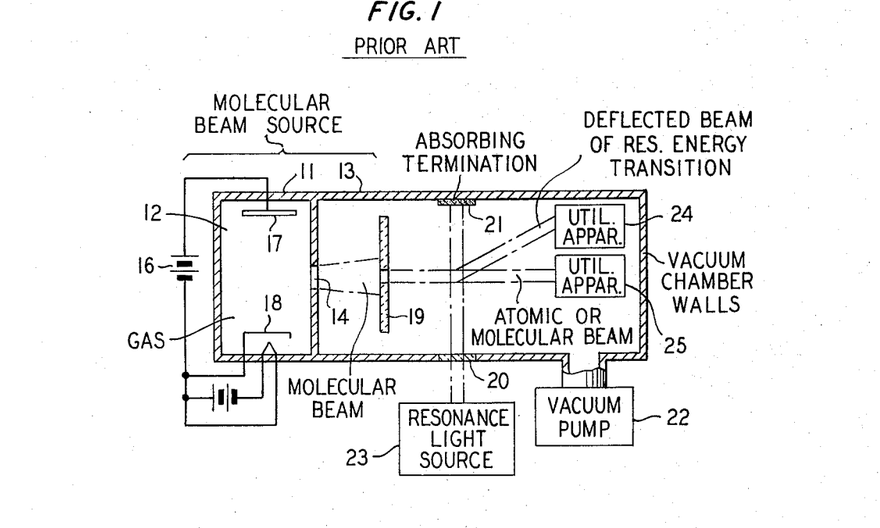
FIG. 1 is a partially pictorial and partially block diagrammatic illustration of an apparatus generally representing prior art apparatus.

The apparatus of FIG. 1 is somewhat similar to that shown in J. Pressman U.S. Pat. No. 3,558,877 and is identical with FIG. 11 of my above-cited copending parent patent application.

In the apparatus of FIG. 1, the deflection of a component of an atomic or molecular beam, or of one of several molecular beams propagating collinearly, is based upon the large resonant cross section of a coherent light beam for a particular species of atom or molecule within the beam or beams.

Thus, a molecular beam source is provided by a reservoir 11 holding a molecular gas 12. The reservoir 11 is coupled to a vacuum chamber 13 through an aperture 14 in a side wall of reservoir 11.

To provide a plurality of the excited species in the molecular beam 15 which issues from reservoir 11, the gas 12 is subjected to an electrical discharge from an electrical source 16 connected between anode 17 and cathode 18 within reservoir 11, or is otherwise heated. The molecular beam 15 is further collimated by the slit apparatus 19 and passes between the transparent window 20 in one wall of vacuum chamber 13 and an absorbing termination 21 on the opposite wall of vacuum chamber 13. Light from a narrow band laser source 23, for which termination 21 is absorbing, is supplied through window 20 to interact resonantly with one species of particle in the molecular beam, illustratively those particles in the lowest state of an optical transition having a photon energy equal to the photon energy of laser source 23. Such particles which absorb and reradiate the laser light experience a net acceleration which carries them toward the utilization apparatus 24. Their optical final state on arrival at utilization apparatus 24 depends upon the transit time between their point of deflection and their arrival at apparatus 24. That time can be selected so that they arrive in the lower state of the aforesaid optical transition. Similarly, the transit time to a second utilization apparatus 25 for the remainder, the undeflected portion, of the beam can be selected so that all particles in that portion arrive at apparatus 25 in a selected state, for example, in the upper state of a second optical transition of interest, as explained in my above-cited copending parent patent application.

At high supplied light intensity, the radiation pressure force upon the resonantly interacting atoms saturates at an essentially constant value, independent of intensity variations of the supplied light. Thus, the apparatus of FIG. 1 is limited in resolution because the deflected atoms acquire a component of velocity along the direction of propagation of the light beam and Doppler-shift out of the resonant interaction.

The following embodiments have as their essence the idea that, if the radiation pressure force is always applied orthogonal to an atom's total velocity, one can produce a constant central force field in which resonantly radiating atoms will follow an arc of the circle so long as they are in the force field. A resonantly radiating atom of specific velocity injected into such a path orthogonal to the direction of the applied force maintains strict resonance with the supplied light. Doppler effects are avoided because, in strict resonance, the atom experiences essentially no change in velocity relative to velocity of the successively absorbed photons. In substantial resonance, the relative velocity may vary slightly but returns to its original value and direction relative to absorbed photons at the focusing point for particles of a selected speed.

Figure 2:
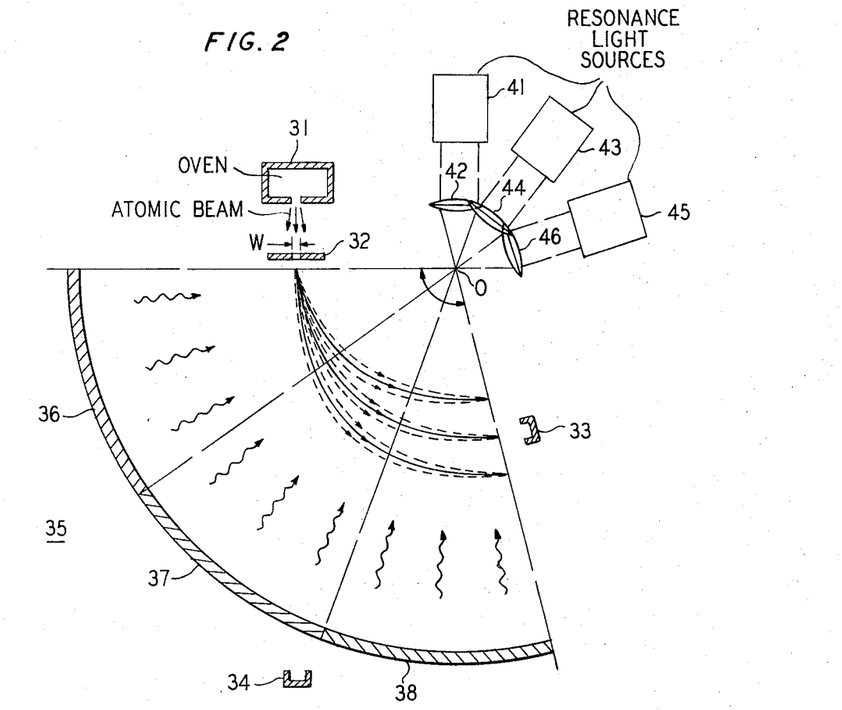
FIG. 2 is a partially pictorial and partially schematic illustration of an atomic velocity analyzer or isotope separator according to my invention.

The neutral atom velocity analyzer of FIG. 2 is constructed on the foregoing idea. The deflection technique to be described affects the linear momentum of the atom. If circulary polarized light is used, angular momentum can simultaneously be imparted to the atom.

In the embodiment of FIG. 2, the atomic beam is supplied from an oven 31 and is collimated by a slit opening therein and an aligned slit in the collimating plate 32. The atoms in the beam which include those illustratively in three different velocity groups enter the light field produced by monochromatic light sources 41, 43 and 45 and focused by lenses 42, 44 and 46 with common focal points at point 0 to illuminate three different tiltable sections 36, 37 and 38 of the reflector 35. Sources 41, 43 and 45 are in different planes, at least with respect to the adjacent source or sources.

Specifically, the light experienced by the particles in the beam comes from reflector 35 since reflector section 37 is advantageously tilted slightly upward and source 43 and lens 44 disposed above the plane of the interaction so that the reflected beam falls within the plane. Similarly, sections 36 and 38 are tilted slightly downward, and the other sources and lenses disposed below the plane of the interaction. Such a segmented arrangement facilitates the achievement of a continuous light field in the plane of the interaction between reflector 35 and the atomic beam. The intensity of this light along each radius to point 0 from reflector 35 must be great enough to exceed the saturation value for radiation pressure upon the resonantly interacting particles or atoms within the respective differing velocity groups. Any particles not interacting with the light can be collected at collector 34 if they pass through reflector 35 or can be collected with a vacuum pump elsewhere or otherwise be simply deposited on reflector 35.

The constant central force field of the light is applied to the atomic beam over an angle of 104°, since my analysis shows that this angle is preferable for focusing the atoms within each velocity group inasmuch as all of the particles return to their original relative velocities, but at separate velocity-dependent positions at this angle subtended by their arc of travel. Thus, position at the 104° angle is a true representation of velocity. A collector 33 collects the resonantly interacting atoms of the desired velocity value, to which the analyzer can be tuned by the appropriate positioning of the collector 33.

The operation of the embodiment of FIG. 2 can best be explained by analyzing the saturation of the radiation pressure forces at high light intensities, as follows. If modifications to the analysis are needed at high values of saturation, it should be possible to study the relevant effects with the proposed velocity analyzer.

Furthermore, light pressure can exert on gases a sizable pressure which can be used to separate atomic or isotopic species due to the selective nature of this force. With the present technique specific isotopic species can also be selected out of an atomic beam containing many atomic species. Here the simplicity of the geometry makes the calculation of the power required to separate a given mass straightforward.

If one irradiates an atom with a beam of resonance radiation, connecting the ground state with an excited state, a radiation pressure force F is exerted on the atom, given by $$F = (h/\lambda)\tau_N^{-1} \cdot f, \quad (1)$$

where $\tau_N$ is the natural lifetime of the excited state and $f$ is the fraction of time the atom spends in the upper state. Equation 1 describes the linear momentum per second scattered isotropically out of an incident beam due to resonance fluorescence from the random spontaneous emission from the upper atomic state. To get $f$ one computes the equilibrium population distribution of N atoms between the ground state and the excited state in the presence of resonance radiation of energy density $w(\nu)$. ($n_1 + n_2 = N$). Using the well-known Einstein A and B coefficients one has $$f = n_2/N \, x/[1 + Ax/Bw(\nu)], \quad (2)$$

where $x = (1 + g_1/g_2)^{-1}$. Saturation occurs if the stimulated emission rate $Bw(\nu)$ is much higher than the spontaneous emission rate $Ax$. Then $f \cong x$. $g_1$ and $g_2$ are degeneracy factors for the lower and upper states. Absorption followed by stimulated emission, by itself, contributes negligibly to the motion of the atom. It results only in a small net drift velocity in the direction of the incident light equal, on the average, to one-half the velocity corresponding to the absorption of a single photon.

If the light intensity is high enough a resonant atom will experience a constant radially directed central force given by Equation 1 througout the illuminated volume. This is true as long as the transverse component of the atom's velocity is less than the velocity required to Doppler-shift out of resonance. For such a force field, atoms of velocity $\nu_o$ satisfying the equation $$F_{sat} = (h/\lambda)x/\tau_N = m\nu_o^2/\rho \quad (3)$$

will follow an arc of a circular orbit of radius $\rho$ and thus can experience large deflection from the original direction. since $\nu_o$ is constant and perpendicular to the force, no Doppler-shift occurs.

This force field has focusing properites in direct analogy with other central-force fields, as for instance the cylindrical E field of electron velocity analyzers. From the differential equation for a particle in a central force field one can derise the differential equation for $\delta$, the departure from the equilibrium orbit of particles entering with the correct velocity $\nu_o$ but an incorrect direction (i.e., not tangential to the equilibrium circle $\rho$):

$$-(3\nu_o^2/\rho^2)\delta = d^2\delta/dt^2. \quad (4)$$

Equation 4 has solutions sin and cos ($\sqrt{3}\nu_o t/\rho$). Thus particles of the correct velocity but wrong injection angle are refocused at $r = \rho$ after transversing an angle of $\pi/\sqrt{3} = 104°$ (see FIG. 1). This is in analogy with the focusing angle of $\pi/\sqrt{2} = 127°$ for electrons in a field $\sim 1/r$ and an angle of $\pi/\sqrt{1} = 180°$ for planetary orbits where the field $\sim 1/r^2$. Particles with the correct injection angle (i.e., tangential, for which $dr/dt=0$) but wrong velocity $\nu_1$, oscillate radially with the same period and return to $dr/dt=0$ after $\pi/\sqrt{3}$ rad but at a new radius $r_1$. This radius is found from the equation for the apsides of the motion, $$(dr/dt)^2 = \nu_1[1-(\rho^2/r^2)] + 2\nu_o[1-(r/\rho)] = 0, \quad (5)$$

which is derived by integrating the euqation of motion or simply writing the law of conservation of energy subject to the boundary condition $dr/dt=0$ at $r=\rho$. From Equation 5 we find that atoms with $\nu_1 < \nu_o$ arrive at the collector $C_1$ with $r_1 < \rho$ and those with $\nu_1 < \nu_o$ arrive with $r_1 > \rho$. For example, if $\nu_1 = 1.05\nu_o$, $r_1 = 1.07\rho$ and if $\nu_1 = 0.95\nu_o$, $r_1 = 0.93\rho$. Atoms injected with $\nu = \nu_1$ but at different angles with respect to the equilibrium orbit at the input are refocused at $r_1$ at the output (see FIG. 1). Thus we have a true velocity analyzer.

Consider now the power required to saturate the force. We rewrite the stimulated absorption (or emission) rate in more detail in terms of the on-resonance absorption corss section $[(\lambda_o^2/2\pi)g_2/g_1]$, the incident intensity $I(\nu)$ of monochromatic light, and the Lorentzian line shape $S(\nu)$:

$$Bw(\nu) = (\lambda_o^2/2\pi)(g_2/g_1)[I(\nu)/h\nu][S(\nu)/4\tau_N],$$

where $$S(\nu) = \gamma N/2\pi[(\nu-\nu_o)^2 + \gamma N = 2/4]; \quad (6)$$

$\gamma N$ is the natural width. ($\gamma N = 1/2\pi\tau_N$ and $1/\tau_N = A$). Referring to Equation 2 one defines a saturation parameter $\Gamma(\nu)$:

$$Bw(\nu) = \Gamma(\nu)Ax \quad (7)$$

which specifies the amount of saturation at frequency $\nu$. From $\Gamma(\nu)$ we get $f$ and also therefore the value of the saturated force F. [$F \sim (1+1/\Gamma)^{-1}$ from Equation 1]. $\Gamma(\nu)$ also gives the force on atoms entering the field at different angles with respect to the equilibrium orbit, since by virtue of the Doppler-shift such atoms absorb at a shifted frequency. Explicitly, $$\Gamma(\nu) = [\lambda_o^2(1+g_2/g_1)I(\nu)S(\nu)]/[8\pi h\nu] = \Gamma(0)[S(\nu)/4\tau_N], \quad (8)$$

where $\Gamma(0)$ is the degree of saturation achieved with intensity $I(\nu) = I_o$ at line center.

As an example, consider Na atoms irradiated with NaD$_2$ resonance light with $\lambda_o = 5,890$ A and $\Gamma N = 10.7$ MHz. Due to the nuclear spin of Na$^{23}$(I=3/2), the $^2S$ ground level is actually split into two levels with F=1,2 whereas the $^2P_{3/2}$ level is split into four closely spaced hyperfine levels with F=0,1,2,3. The selection rule $\Delta F = \pm 1,0$ permits one, in principle, to interact with either level of the split ground state without coupling to the other. However, to avoid the possibility of cross coupling due to the close spacing of the upper F levels, it is advantageous to use light with circular polarization ($\sigma^+$) connecting the degenerate magnetic sublevel $m_F = 2$ of the F=2 ground state with the $m_F = 3$ magnetic sublevel of the F=3 upper level. Decay from the $m_F = 3$ excited sublevel to any other degenerate sublevels of either F=2 or F= 1 is prohibited by the $\Delta m_F = \pm 1$ selection rule for $\sigma$ components. Statistically one-eighth of all ground-state atoms emerging from the source will be in the F=2, $m_F$=2 magnetic sublevel. This fraction will be increased by the $\sigma^+$ optical pumping from the other $m_F$ sublevels of F=2. I have thus, in effect, achieved an ideal two-level system of the type considered above in which, in addition, all the deflected atoms have completely oriented spins. For the case considered $g_2/g_1$=1. This example suggests that the deflection technique can be used to supplement existing atomic beam techniques for studying hyperfine structure, nuclear magnetic moments, and atomic orientation by optical pumping.

Applying Equation 8 to the $NaD_2$ line, one finds $$\Gamma(0) = I_0(W/cm^2)/2.1 \times 10^{-2}. \quad (9)$$

If incoming atoms are restricted by slits of width $w$ and height $h$ parallel to the cylindric axis of the analyzer, then we must provide the saturating light intensity $I_0$ over an area of $\pi \rho h \sqrt{3}$. If the source temperature is T=510°, then the Na pressure =$10^{-3}$ Torr, the density $n_0$=3.4×10$^{13}$ atoms/cm$^3$, the mean free path L=30 cm, and the average atomic velocity $v_{av}$=$(2kT/m)^{1/2}$=6.1×10$^4$ cm/sec. If we consider atoms with velocity $v_0$=$v_{av}/3 \cong 2 \times 10^4$ cm/sec, then from Equation 3 the equilibrium orbit radius $\rho$=4.0 cm. Taking $h$=0.1 cm, and $\Gamma(0)$=10$^2$, we must therefore have a total power of $2.1 \times 10^{-2} \times 10^2 \times \pi(4)(0.1)/\sqrt{3}$=1.5W of resonance power in the incident beam. This situation is appropriate for a cw experiment. To calculate an acceptance angle for incoming particles we specify that $\Gamma(v)$ vary from a minimum of 10 to a maximum of 10$^2$ within the acceptance angle. This yeilds a range of ±2.6°. An atom making an angle of 2.6° with respect to the equilibrium orbit is absorbing at a Doppler-shifted frequency of $(v-v_0)$=1.5$\Gamma_N$ with $\Gamma(v)$=10. The number of atoms emerging from the source within this angular tolerance with velocity $v$=$v_{av}/3 \pm \frac{1}{2}\%$ is ~2.2×10$^{11}$ atoms/cm$^2$ sec. If we use slits of width $w$=$\rho$/100=0.04 cm and $h$=0.1 we have a flux of ~10$^8$ atoms/sec which is adequate for most experiments.

A useful feature of the analyzer is its insensitivity to light intensity variations when strongly saturated [$\Gamma(v) \geq 10$]. Thus the incoming light could be part of a TEM$_{oo}$ Gaussian-mode beam, with the atoms following a phase front. Since a far-field diffraction angle of $\pi/\sqrt{3}$ represents rather tight focusing one could break the incoming beam into separate beams without much difficulty. Although the total optical power required is fairly modest, it can be further reduced by using a scheme where the unscattered light is recirculated through the analyzer.

Figure 3:
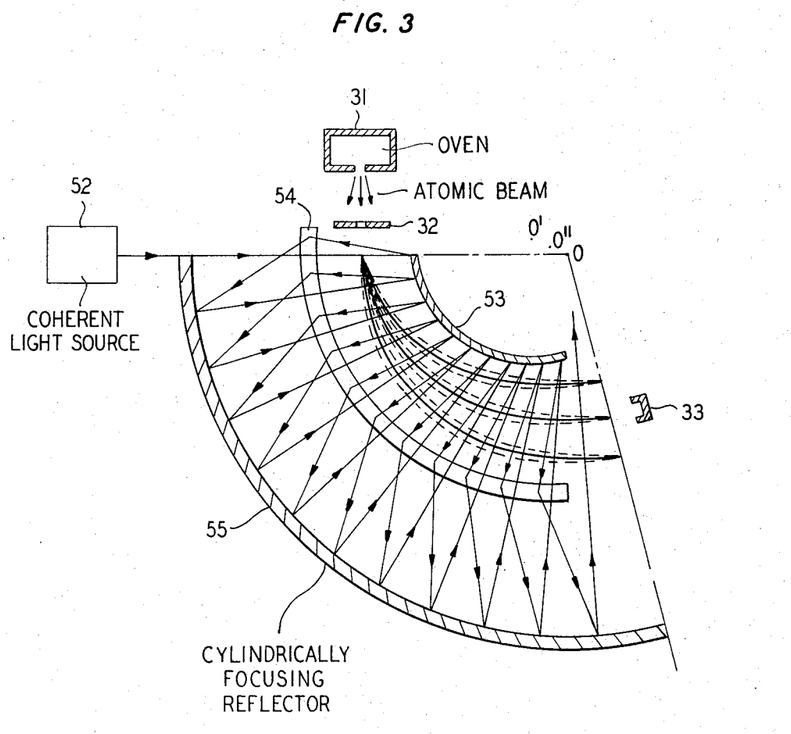
FIG. 3 shows a partially pictorial and partially schematic modified embodiment of a velocity analyzer.

In the modified embodiment of FIG. 3, the segmented reflector technique of FIG. 2 is replaced by an arrangement for providing multiple overlapping passes of a single laser beam from a source 52. This beam is directed orthogonal to the initial path of the atomic beam toward point 0 without intercepting concave reflector 55. It is intercepted before point 0 by another reflector 53 which is a convex reflector and is substantially concentric with reflector 55 but with its center of curvature displaced from point 0 by an amount directly related to the desired amount of lateral offset of the beam from reflector 55 in creating the continuous central lifht field. Reflector 53 is also tilted slightly to direct the beam upward out of the plane of the interaction toward reflector 54. Reflector 54 is a flat reflector which is formed to have a crescent shape within a plane parallel to the plane of interaction, its radius of curvature is intermediate those of reflectors 53 and 55; and its center of curvature is intermediate the centers of curvature of reflectors 53 and 55. It directs the beam onto reflector 55, which is tilted upward at an angle sufficient to direct the beam reflected from it in the plane of the interaction toward point 0 and overlapping, or at least contiguous with, the initial path of the beam as it passes through the path of the atomic beam.

In operation, the embodiment of FIG. 3 would appear to make the most efficient use of the supplied monochromatic coherent light.

Figure 4:
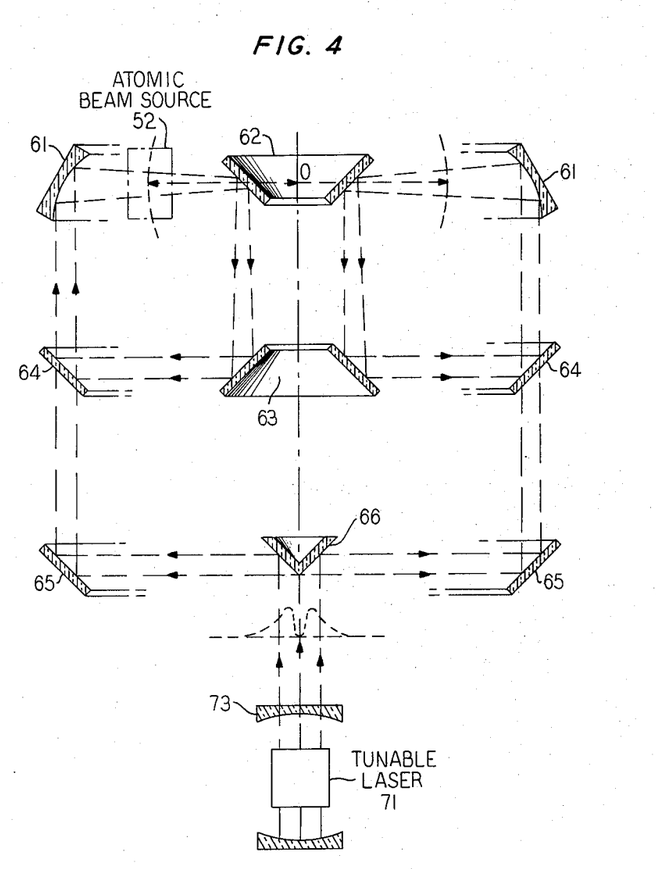
FIG. 4 is a partially pictorial and partially block diagrammatic illustration of an apparatus for trapping atoms in circular orbits.

A further modification of interest is to depart from strict cylindrical geometry and use spherical beams in analogy to the well-known Purcell velocity analyzer for electrons. Such a geometry is shown in FIG. 4. It could provide vertical focusing of the light as well as radial focusing and traps the atoms in a stable circular orbit so long as the resonant interaction is maintained at saturation. It may be seen that all of the reflectors 61 through 66 of FIG. 4 are bodies of revolution centering about the axis A—A'. When supplied by a monochromatic coherent light beam from the tunable laser 71 directed upon the conical reflector 66, these reflectors 61 through 66 provide a constant central force field on the particles or atoms P which are orbiting around axis A—A' between reflectors 61 and 62. The light flux is incident over $2\pi$ radians of such an orbit and can only allow the atoms to escape if interrupted sufficiently at some point. It may also be seen that the apparatus of FIG. 4 includes means for recirculating at least some of the coherent light so that efficiency is improved.

The velocity analyzer of FIGS. 2 and 3 can also serve as isotope selectors, since only resonant atoms are deflected to the desired collector 33 of FIG. 2, for example. Nonresonant species proceed undeflected to $C_2$. For particle selectors of this type it is simple to calculate the optical power needed to separate atoms. An atom of velocity $v_0$ spends a time = $(\pi/\sqrt{3})\rho/v_0$ in the light field and scatters $2t_N^{-1}(\pi/\sqrt{3})\rho/v_0$ photons which by Equations 1 and 2 equals $(\pi/\sqrt{3})mv_0(h/\lambda)^{-1}$. If we use qP×10$^7$/$hv$ photons/sec, where qP is the fraction of the incident power in watts scattered, the number of atoms/sec N we collect is $$N = (\sqrt{3}/\pi)(qP \times 10^7/mv_0 c). \quad (9)$$

Equation 9 shows that the number of atoms/sec collected depends on P and the incident velocity $v_0$ but not on the force $F_{sat}$. $F_{sat}$ and $v_0$ do, however, determined the size of the orbit radius as seen in Equation 3. Using $v_0$=2×10$^4$ cm/sec one finds that it takes 1.2×10$^4$ photons per atom collected. Assuming 9~1, N=2.4×10$^{14}$ atoms/sec W collected. With the expenditure of 1 kW h we can collect a mass of 30 mg.

This calculation points out the usefulness of resonance radiation pressure for separating, trapping, and velocity analyzing neutral atoms. It should also prove useful in studying the details of the basic interaction of atoms with high-intensity monochromatic light.

Figure 5:
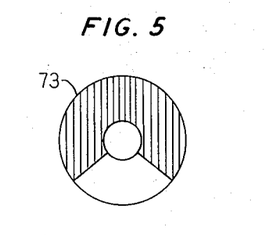
FIG. 5 shows pictorially a modification of the front reflector of the laser of FIG. 4 to modify the apparatus of FIG. 3 for velocity analysis or isotope separation.

The embodiment of FIG. 5 modifies the embodiment of FIG. 4 to perform a velocity analysis or isotope separation, instead of trapping the resonantly interacting atoms. This result is achieved merely by modifying the front reflector 73 of laser 71, as shown in FIG. 5, so that an output is coupled from the laser only over 104° of the full 360° of the doughnut-shaped mode about axis A—A'. This apparatus would appear similar to that of FIG. 2 if viewed from the top except that reflector 35 is replaced by the circularly symmetrical reflector 61 and sources 41, 43 and 45 and lenses 42, 44 and 46 are eliminated in favor of the single laser source 73 which would be below point 0 of FIG. 2.

I claim:

1. Apparatus for deflecting a neutral particle beam by radiation pressure, comprising
    means for generating said particle beam,
    means for generating a beam of substantially coherent, substantially monochromatic radiation of frequency matching the frequency of a resonant radiative transition of at least some of the particles of said beam, and
    means for focusing and directing said beam of radiation upon said particles in a convergent traveling wave to produce a substantially saturated resonance radiation interaction with said particles and a substantially constant central force field upon said particles throughout at least an arc of travel of said particles, said arc subtending an angle greater than 90°, and means for collecting a portion of said particles for utilization.

2. Apparatus according to claim 1 in which the focusing and directing means comprises a plurality of curved reflectors disposed to focus the monochromatic radiation radially toward the center of said force field in a continuous pattern throughout the arc of travel.

3. Apparatus according to claim 2 in which the means for generating the beam of substantially monochromatic radiation comprise a plurality of sources of said radiation disposed to transmit their beams alternately above or below the plane of the arc of travel at successive positions along said arc and the plurality of reflectors are respectively tilted with their normals above or below the plane of said arc to direct the respective beams in said plane in a substantially continuous arrangement along said arc.

4. Apparatus according to claim 2 in which the plurality of reflectors comprise at least three curved reflectors of which two have surfaces intersecting the plane of the constant central force field and have centers of curvature offset from one another, the third mirror having a position and a centere of curvature outside of said central force field and having an orientation to provide multiple passes of the beam of monochromatic radiation through said arc with repeated lateral offset from the last position of passage through said arc.

5. Apparatus according to claim 2 in which the plurality of reflectors are at least portions of bodies of revolution about an axis passing through the center of the force field and the means for generating the beam of substantially monochromatic radiation comprises a laser oscillating in a doughnut-shaped mode centered on said axis.

6. Apparatus according to claim 5 in which the laser has an output reflector coupling out only a portion of the doughnut-shaped mode, whereby the angle subtended by the arc of travel is limited.

* * * * *

UNITED STATES PATENT OFFICE
CERTIFICATE OF CORRECTION

Patent No. 3,778,612             Dated December 11, 1973

Inventor(s) Arthur Ashkin

It is certified that error appears in the above-identified patent and that said Letters Patent are hereby corrected as shown below:

On the Title and Abstract page, add assignee: Bell Telephone Laboratories, Incorporated, Murray Hill, Berkeley Heights, N.J., a corporation of New York -- .

Column 2, line 19, "s" should read --as--, line 32, "beam" should read --beams--.

Column 4, line 7, "circulary" should read --circularly--.

Column 5, line 45, "since" should read --Since--, line 51, "derise" should read -- derive -- .

Column 6, line 12, "$v_1 < v_o$" should read --$v_1 > v_o$--.

line 21, "corss" should read --cross--, line 28, after "(6)" delete "Ax", line 54, "$^2S$" should read --$^2S_{1/2}$--.

Column 7, line 22, "$\pi ph \sqrt{3}$ should read --$\pi ph/\sqrt{3}$ --.

line 38, "$1.5\Gamma_N$" should read --$1.5\gamma_N$--.

line 67 "lifht" should read --light--.

UNITED STATES PATENT OFFICE
CERTIFICATE OF CORRECTION

Patent No. 3,778,612　　　　　　　　Dated December 11, 1973

Inventor(s)　Arthur Ashkin

It is certified that error appears in the above-identified patent and that said Letters Patent are hereby corrected as shown below:

Column 8, line 8, "determine" should read --determined--.

line 58, "9∿1" should read -- q∿1 -- .

Column 10, line 16, "centere" should read --center--.

Signed and sealed this 6th day of August 1974.

(SEAL)
Attest:

McCOY M. GIBSON, JR.　　　　　C. MARSHALL DANN
Attesting Officer　　　　　　Commissioner of Patents